United States Patent [19]

Kimoto et al.

[11] Patent Number: 5,303,294
[45] Date of Patent: Apr. 12, 1994

[54] VIDEO THEATER SYSTEM AND COPY PREVENTIVE METHOD

[75] Inventors: Takayuki Kimoto, Hirakata; Toshimitsu Fujimori, Takatsuki; Toshikatsu Kawakami, Osaka; Tatsuhiro Hosokawa, Ibaraki, all of Japan

[73] Assignee: Matsushita Electric Industrial Co., Ltd., Osaka, Japan

[21] Appl. No.: 896,674

[22] Filed: Jun. 10, 1992

[30] Foreign Application Priority Data

Jun. 18, 1991 [JP] Japan ............................ 3-145818
Oct. 1, 1991 [JP] Japan ............................ 3-253365

[51] Int. Cl.$^5$ ............................................ H04N 7/167
[52] U.S. Cl. ............................................ 380/5; 380/10; 360/3; 360/60; 360/80; 358/335; 348/104; 348/5; 348/744
[58] Field of Search ............... 360/3, 60, 80; 358/54, 358/56, 60, 214, 230, 231, 335

[56] References Cited

U.S. PATENT DOCUMENTS

| | | | |
|---|---|---|---|
| 3,033,922 | 5/1962 | Campbell, Jr. et al. | 380/10 |
| 3,963,865 | 6/1976 | Songer | 380/5 |
| 4,100,575 | 7/1978 | Morio et al. | 380/5 |
| 4,907,273 | 3/1990 | Wiedemer | 380/5 X |
| 4,942,488 | 7/1990 | Osawa | 360/80 |
| 5,134,496 | 7/1992 | Schwab et al. | 358/335 |
| 5,155,767 | 10/1992 | Noller | 380/5 |

OTHER PUBLICATIONS

H. Griesshaber, "Managing Secure and Confidential Video Distribution", *IEEE 1991 International Conference on Consumer Electronics,* at 74–75 (Jun. 1991).

Primary Examiner—Bernarr E. Gregory
Attorney, Agent, or Firm—Ratner & Prestia

[57] ABSTRACT

A video theater system includes a video cassette recording at least a component video signal to which a copy preventive scheme has been applied; a video cassette recorder for reproducing the video cassette; a tuner and an antenna for receiving a signal transmitted via a satellite; a controller device for controlling the video cassette recorder and the tuner; means for releasing the copy preventive scheme; and a projector for projecting a video image from which the copy preventive scheme has been released. The copy preventive scheme is applied, while at least a synchronizing signal is retained, to a protected video signal at a point between dubbing of the master tape to the distribution tape after a video conversion and the second video cassette recorder. This copy preventive scheme is released by means of a device and circuit following a video cassette recorder used to reproduce the video signal in readiness for the projection thereof onto a screen.

10 Claims, 6 Drawing Sheets

VIDEO THEATER SYSTEM AND COPY PREVENTIVE METHOD

BACKGROUND OF THE INVENTION

1. Field of the Invention

The present invention relates to a video theater system for projecting a movies film by tele-cinematizing it and by receiving a signal reproduced from a videocassette for VCR or via a satellite.

2. Description of the Prior Art

While there were approximately 7,500 movie theaters in Japan during the late 1960s, improvements in and greater access to color televisions in the home started to intrude on the theater-going movie audience. With the development of video tape recorders and the introduction of rental videos, this erosion of the movie industry continued, and in 1989 the number of theaters in Japan had fallen to 1,912.

In the United States, however, the introduction of more efficient theater equipment and the development of new cinema complexes with several theaters grouped together have increased the number of theaters from 20,000 to 24,000 over the last several years while also increasing gross income.

In an attempt to halt the erosion of the industry in Japan, theaters have taken steps to improve operating efficiency, improve the quality of the seats, and construct new mini-theaters, among other measures, but with no noticeable effect.

While the movie industry has been confronted with a deteriorating situation, new video theaters which project videos instead of movie films have sprung up in many cities. These video theaters are typically installed in supermarkets, department stores, and similar retail outlets as an extension of the distribution industry rather than as independent movies theaters. They are also typically small with seating for about one hundred people, and are fully automated.

The video tapes distributed for use in these video theaters are typically manufactured, duplicated, and played back by a process such as shown in FIG. 7. The movie film 1 is first converted to a video tape using a telecinematizing device or video converter 2. The video converter 2 effects a photoelectric conversion and then a color correction to improve color reproducibility. A digital video cassette recorder (VCR) 3 records the converted video signal on a video tape to provide the master video tape 4. A plurality of tapes 7 for distribution to video theaters are then produced from the master video tape 4 using an M2-format VCR 6 such as the model AU-650 VCR available from Matsushita Electric Industrial Corporation of Japan. These distribution tapes 7 are used for movie projection in the video theaters. The theaters use plural M2-format playback VCRs 8 and a selector 9 to choose the output video. The selected video signal is then inputted to an ED/WD digital scan converter 10 for signal compression, and then projected by the projector 11.

As described above, the distribution tapes used in the video theaters are converted from the movie film to produce the master tape which is then dubbed to produce the distribution tapes for distribution to the individual video theaters.

Once these tapes pass to the video theaters, how they are used can only be controlled by each theater, making it easy to produce illegal copies with an adverse effect on the video rental industry. In addition, while there are some video tapes with copy protection applied, most of these are simple schemes with a slight modification of the horizontal synchronization signal in the video signal, leaving the video signal itself unprotected and making the copy preventive scheme relatively easy to break.

Also, with a wide-spread of the video theaters, the distribution tapes must be prepared in a number corresponding to or in excess of the number of the video theaters, forcing a video tape distributor to supervise an increased number of the distribution tapes while incurring an increased cost necessary to project the video image at a remote place.

SUMMARY OF THE INVENTION

In view of the foregoing, the present invention is intended to provide a video theater system and a controller device therefor, which have been devised with due regards paid to the illegal copying and which can concurrently make use of a video signal from the VCR tape and a signal transmitted via a satellite.

Another important object of the present invention is to a copy prevention system and copy prevention method providing high security in a video theater system.

In order to substantially eliminate the above discussed problems, the present invention is applied to a video theater system comprising a video converter (a tele-cinematizing device) that photoelectrically converts a movie and effects a color correction, a video cassette recorder that produces a master tape from the signal outputted from the video converter, a video cassette recorder that duplicates the master tape to produce distribution tapes, a video cassette recorder that plays back the distribution tape, a controller, and a projection means. A copy prevention protection system according to the present invention is operable to effect a copy guard while maintaining at least a synchronizing signal in the protected video signal at a point between dubbing the master tape to the distribution tape after video conversion and the playback VCR, and by releasing the copy guard by means of a device and circuit following the playback VCR.

The copy prevention method of the present invention scrambles the video signal by using at least line permutation or polarity reversion while maintaining the synchronization signal in the protected video signal in a video theater system comprising a video converter (a telecinematizing device) that photoelectrically converts a movie and applies color correction, a video cassette recorder that produces a master tape from the signal outputted from the video converter, a video cassette recorder that duplicates the master tape to produce distribution tapes, a video cassette recorder that plays back the distribution tape, a controller, and a projection means.

The present invention also provides a video theater system which comprises a VCR tape having recorded therein at least a component video signal guarded against an unauthorized copying, a VCR device for reproducing the VCR tape, a tuner including a local uplink antenna for receipt of signals transmitted via a satellite, a controller for controlling the VCR device and the tuner, a copy guard releasing device and a projection device.

The controller included in the video theater system according to the present invention includes a first input terminal to which an output signal reproduced from the VCR tape having recorded therein at least the component video signal guarded against an unauthorized copying is applied, and a second input terminal to which the signals transmitted from the uplink antenna and the tuner are applied, a descrambling device for selecting one of the signals inputted respectively to the first and second input terminals and descrambling an output signal which has been selected, and an output terminal from which the descrambled signal emerges.

Thus, since the copy preventive system of the present invention is such that a copy guard is effected at the time of dubbing of the distribution tapes and that an output from the playback VCR is reproduced in a scrambled condition while at least a synchronizing signal of a video signal is maintained so that the copy guard can be released by descrambling with a device and a circuit following the playback VCR, any one of the distribution tapes is nor recorded with a normal video information, thereby to provide a high security.

Also, according to the present invention, since a video scrambling is effected by means of aline permutation or polarity inversion while the synchronizing signal is maintained, the synchronizing signal is retained and, therefore, even in the scrambled condition, a reproduction with VCR is possible. Accordingly, the copy preventive system of the present invention can be practised merely by adding the descrambling device and a circuit to the existing theater system, the present invention is effective to provide a high efficiency. In addition, although the line permutation and the polarity inversion may be employed in combination if required, any of these systems has a feature in that any reduction in quality of the reconstructed image due to an incompleteness characteristic of a transmission system, VCR and/or the projector does hardly occur.

According to the video theater system of the present invention, the scrambling is effected at the time the master tape is copied to the distribution tapes and the same scrambling as that effected to the distribution tapes is similarly effected to the signals transmitted via the satellite. Therefore, after receipt of these signals, a descrambling can be accomplished with a single descrambler and softwares distributed in different forms for transmission and packaging systems can be concurrently used.

Furthermore, the controller used in the video theater system according to the present invention includes a first input terminal to which an output signal reproduced from the VCR tape having recorded therein at least the video signal which has been scrambled is applied, and a second input terminal to which the signals transmitted from the uplink antenna and the tuner are applied, a descrambling device for selecting one of the signals inputted respectively to the first and second input terminals and descrambling an output signal which has been selected. Therefore, a high security can be equally secured in both of the transmission packaging systems and, also, no substantial reduction in quality of the reconstructed video information occur.

BRIEF DESCRIPTION OF THE DRAWINGS

The present invention will become more fully understood from the detailed description given below with reference to the accompanying drawings, wherein.

DESCRIPTION OF PREFERRED EMBODIMENTS

Figure 1:
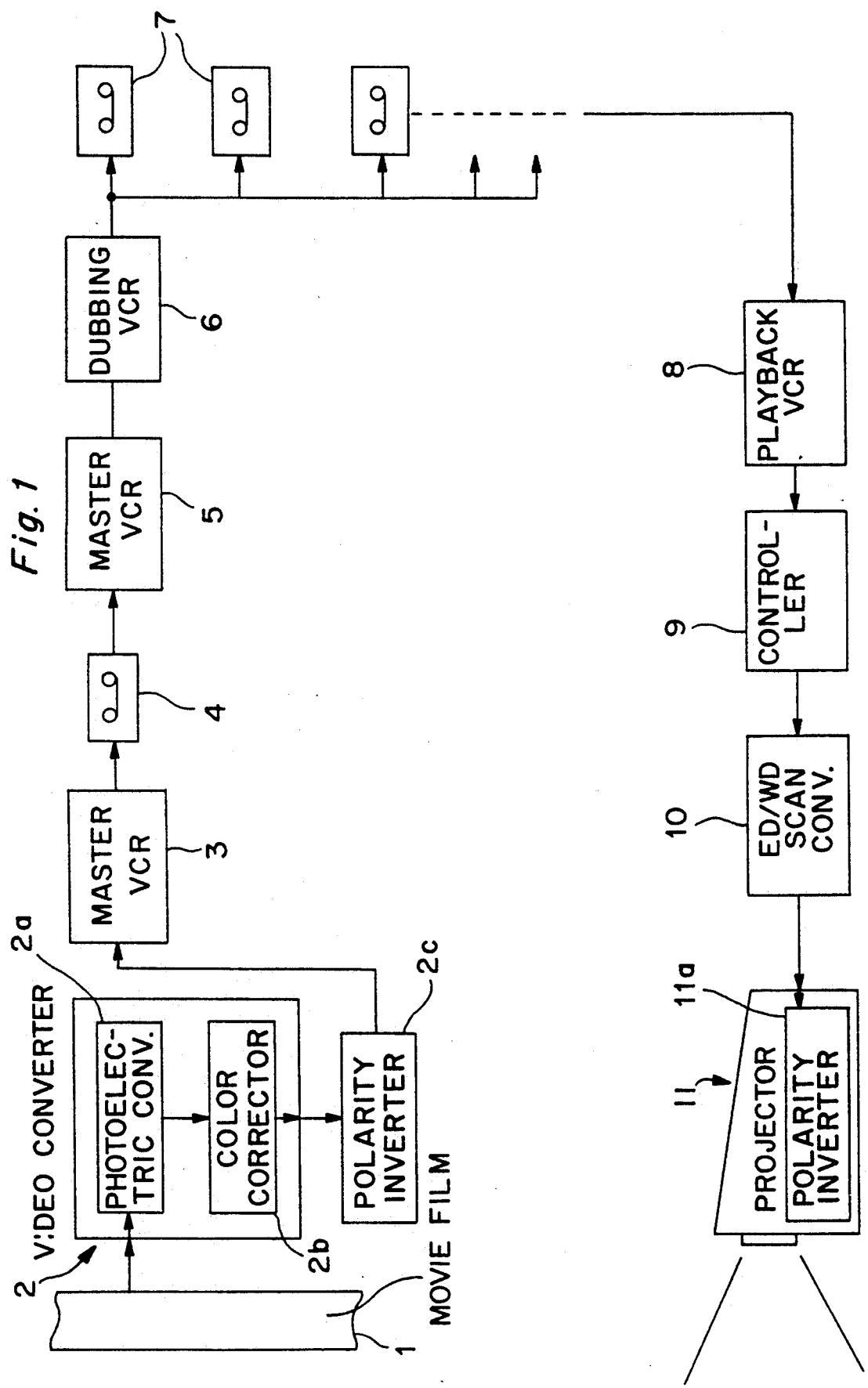
FIG. 1 is a block diagram of a video theater system wherein polarity inversion is applied to the video signal according to a first embodiment of the invention during the conversion of a movie to a video tape for projection in a video theater.

The preferred embodiments of the copy preventive system and the copy preventive method of the present invention will be described hereinafter with reference to the accompanying drawings in which like parts are designated by like reference numerals.

FIG. 1 is a block diagram of a video theater system whereby a program is converted from a movie film and recorded to a videotape for projection in a video theater. This system is substantially similar to the conventional video theater system except that a polarity inversion circuit 2c is added to the output section of the video converter 2, and that a video re-inversion circuit 12a has been added inside the projector.

In the illustrated system, polarity inversion is applied after the movie film 1 is converted to a video signal. While it is preferred to apply the copy preventive processing after color correction, it may also be applied before color correction. This polarity inversion process inverts the waveforms of the video signal other than the synchronizing signal component, resulting in an image of the normal video image that is comparable to the negative image of a photograph.

Furthermore, the copy preventive scheme is released in the projector 11 as it is considered the most desirable place for it to be applied. However, the copy preventive scheme can also be released in the selector 9 or the ED/WD digital scan converter 10, however, with a slight decrease in security but with the additional advantage of being able to connect a monitor screen.

A high security copy preventive system and copy preventive method are thus achieved by applying the copy preventive processing that maintains at least the synchronizing signal of the component video signal at a point between dubbing the master tape to the distribution tape and the playback VCR, and by releasing the copying preventive scheme by means of a device and circuit following the playback VCR.

Figure 2:
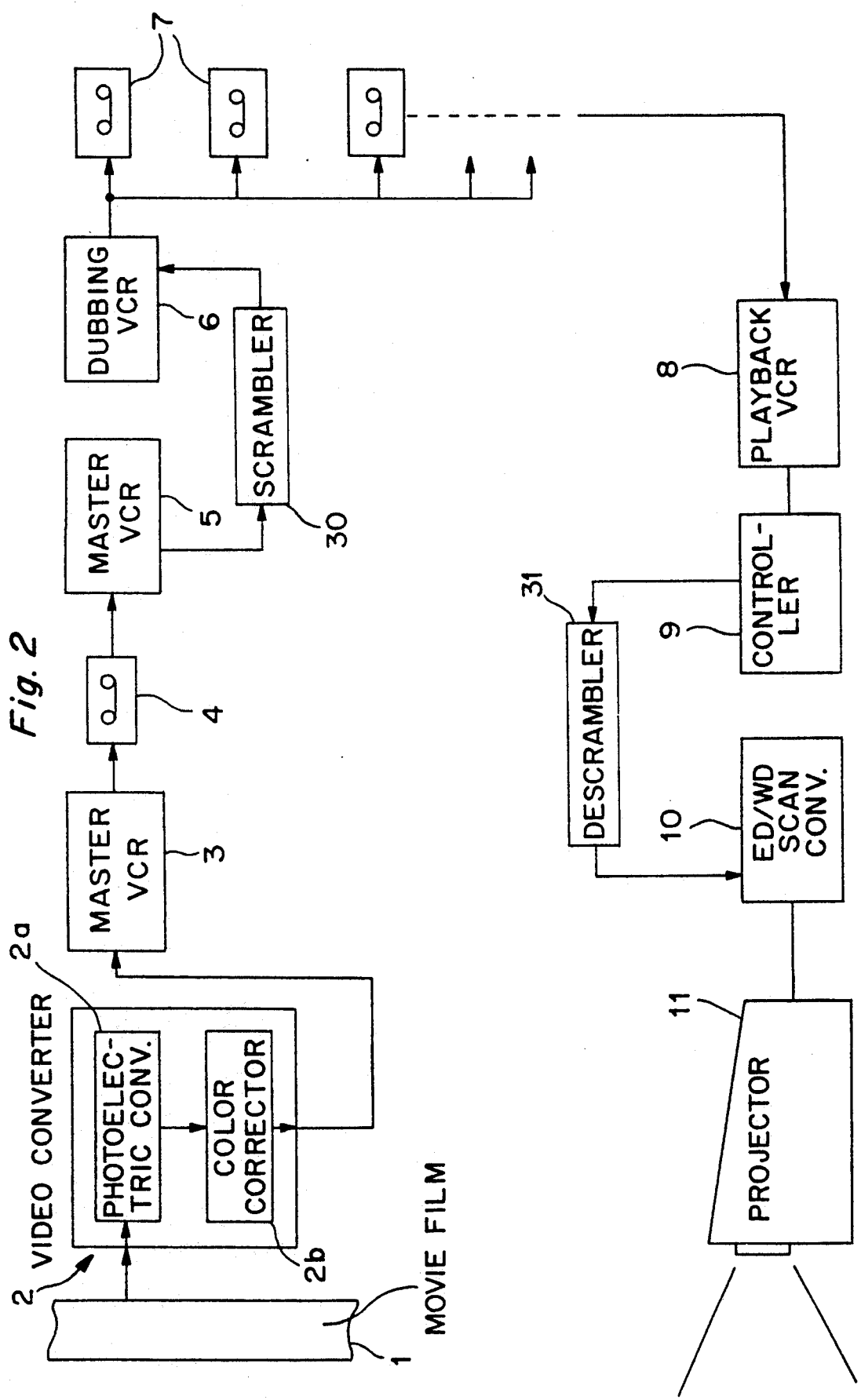
FIG. 2 is a block diagram of a video theater system wherein line permutation is applied to the video signal according to a second embodiment of the invention during the conversion of a movie to a video tape for projection in a video theater.

In the alternative system shown in FIG. 2, the copy preventive processing is applied during dubbing from the master video tape 4 to the distribution tapes 7, and the copy preventive scheme is released in the output stage of the controller. In this method, line permutation is used as the copy preventive scheme. The copy preventive scheme is applied by a scrambler 30 connected in line during dubbing, and is released by a descrambler 31 connected between the controller device 9 and the ED/WD scan converter 10.

Figure 3:
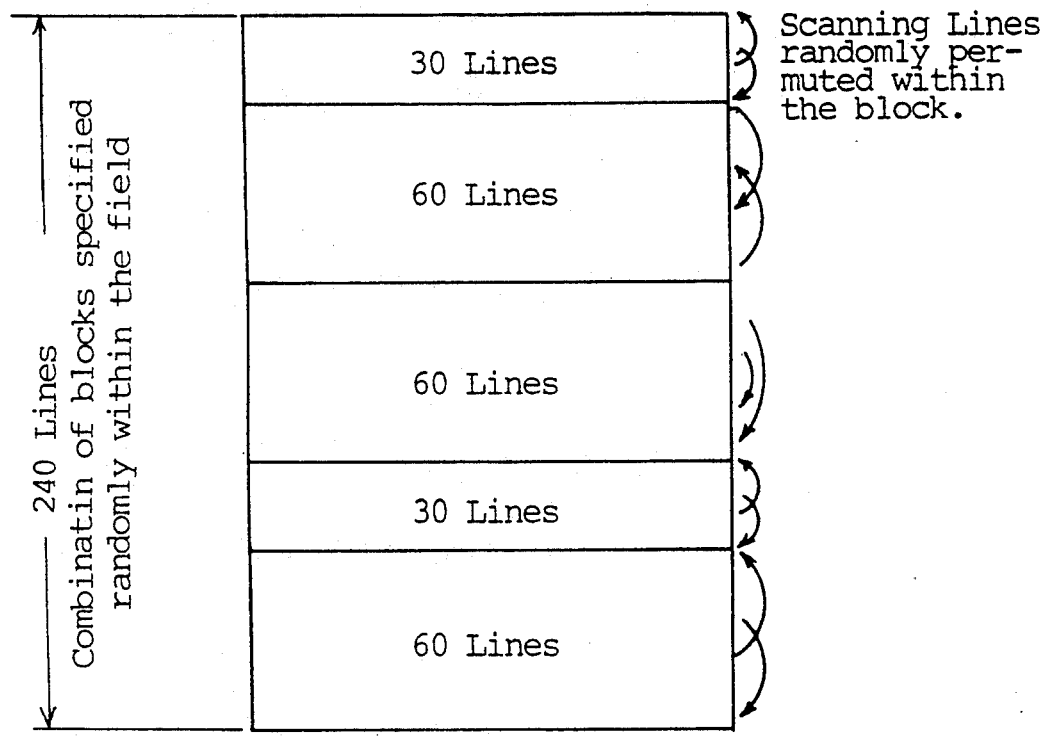
FIG. 3 is an illustration of video scrambling by line permutation according to the second embodiment of the invention.

In the line permutation scrambling, the effective screen area of each field is divided into 240 scan lines which are then grouped in blocks of 30 or 60 lines as shown in FIG. 3. These two different blocks are randomly generated, and the lines in each block are further randomized. This compound randomization makes it more difficult to interpret the block boundaries. In this case, a scrambling key is inserted to the vertical blanking period, and the descrambler uses this key to restore the image. Furthermore, D/A conversion can be applied to the signal after scrambling for recording to an M2-format VCR because the scrambling has been carried out while the synchronizing signal is retained. The video signal is transmitted at this stage by means of the Y (luminance signal) and $P_B$ and $P_R$ (color difference signals) component signals. The Y (luminance signal) and $P_B$ and $P_R$ (color difference signals) component signals are also used to send the video signal to the projector in the theater.

In view of the foregoing, as compared with the composite signals, a faithful color reproduction can be advantageously accomplished. Although in this alternative embodiment the color difference signals have been described as scrambled, the scrambling may be effected to all other signals.

Figure 4:
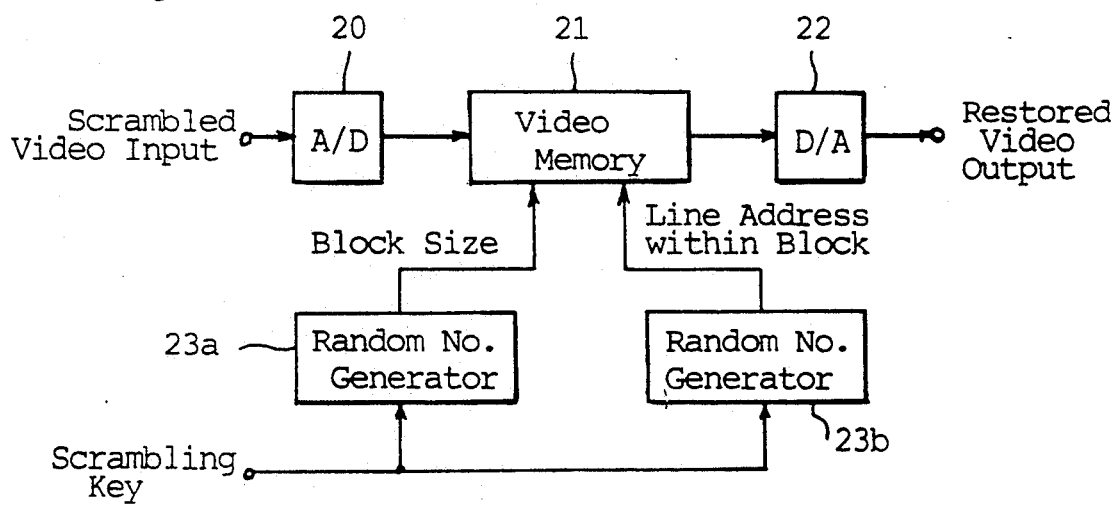
FIG. 4 is a block diagram of a descrambler in the second embodiment of the invention.

The scrambled distribution tapes are descrambled after being played back and selected by the VCR in the video theater. FIG. 4 is a block diagram of the device used to restore the line permutation-scrambled video image. The scan lines are reassembled by digitizing the video image, specifying an address according to a random number generated by the scrambler key, and the writing the line to the corresponding address in a memory 21. This sequence is essentially reversed during the scrambling process so that the order of the scan lines can be restored to the original order at the receiver side. By thus scrambling the signal in the copy preventive system according to this method, the scrambled signal can be recorded and played back by the VCR, and the distributed tapes are extremely secure.

As described hereinabove, the normal video image is not recorded to the distribution tapes and the distribution tapes are therefore very secure because the copy preventive system according to the present invention applies the copy preventing process during dubbing of the distribution tapes, the output of the playback VCR is reproduced in a scrambled condition with no synchronizing signal of the video signal being altered and the scrambled video signal is descrambled to release the copy preventive scheme by means of a device and circuit on the output side of the playback VCR. Therefore, the distribution tapes are not recorded with a normal video image thereby to keep the information in complete privacy.

Furthermore, because the copy preventive method according to the present invention scrambles the video signal by line permutation or polarity inversion while retaining the synchronizing signal, the synchronization signal enables the scrambled video signal to be played back by the playback VCR. This method therefore features excellent commercial efficiency because it can be implemented in existing video theater systems by simply adding a descrambler device and circuit. Moreover, while line permutation and polarity inversion can be used in combination as may be required, both methods are resistant to deterioration of the stored video image due to insufficient characteristics in the transmission system, VCR, or projector. This copy preventive method is therefore compatible with the image quality standards of a video theater system, and the commercial value of the present invention is high.

Figure 5:
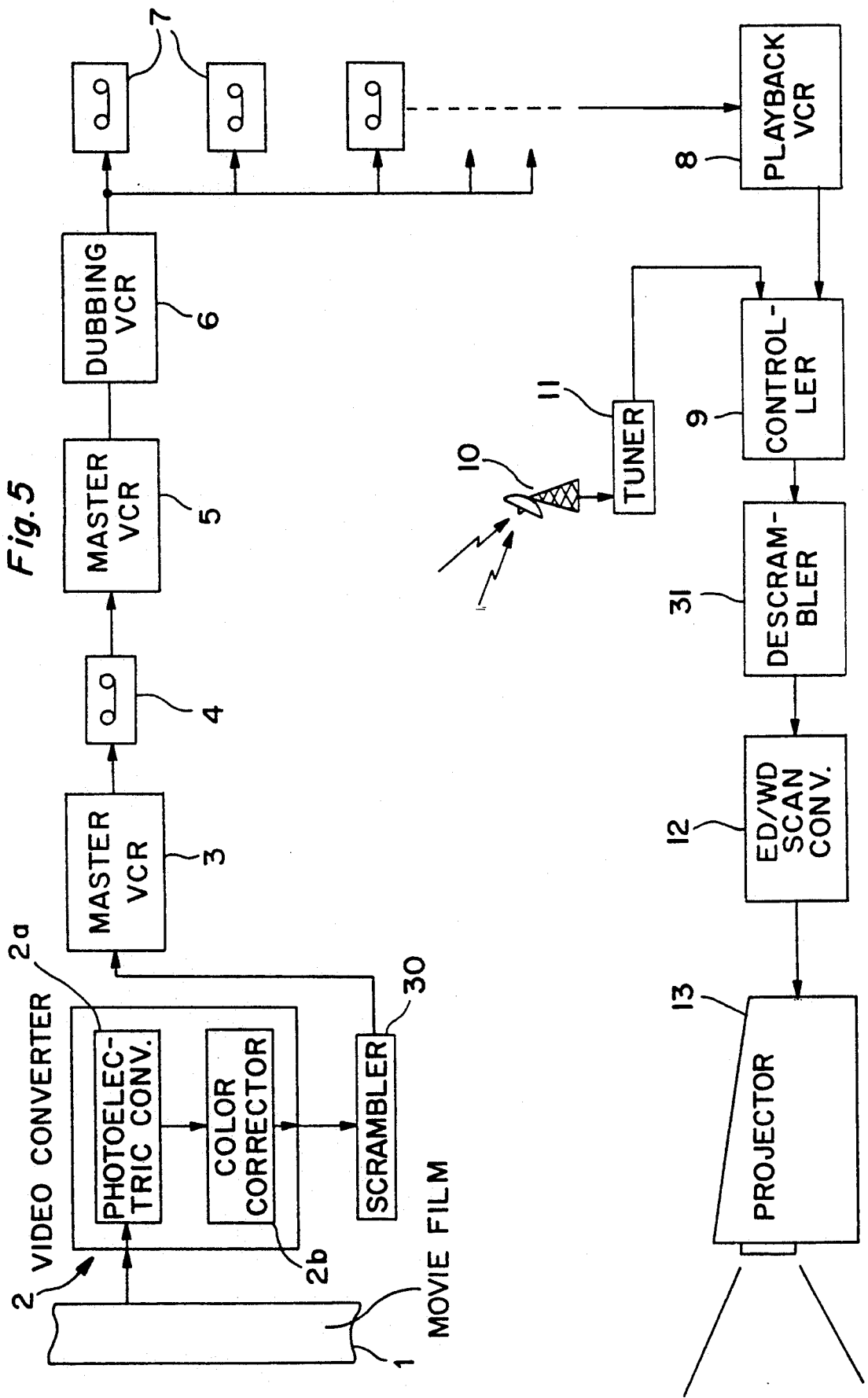
FIGS. 5 and 6 are diagrams similar to FIG. 2, showing third and fourth preferred embodiments of the present invention.

FIG. 5 is a block diagram similar to FIG. 1, but illustrating a third preferred embodiment of the present invention.

Referring now to FIG. 5, the scrambler 30 is installed in an output stage of the video converter 2. So far shown therein, the scrambling is effected after the color correction has been effected to the video signal. However, the video signal may be scrambled before the color correction. Also, the scrambler 30 may be interposed between the master VCR 5 for the reproduction of the master tape and the dubbing VCR 6 for dubbing the master tape to prepare the distribution tapes. For the purpose of video signal scrambling, a line rotation method was employed. In a theater, an uplink antenna 10 for receiving a wave signal which has been scrambled according to the line rotation method and which has been transmitted via a satellite and a tuner 11 are installed, and the received video signal is inputted to the controller device 9.

The playback VCR 8 used to play back the VCR tape which has been scrambled is inputted to the controller device 9. The controller device 9 selects, and outputs therefrom, one of the composite signal transmitted via the satellite and the component signal originating from VCR. An output from the controller device 9 is descrambled in the descrambler 31 to provide the reconstructed video signal which is subsequently supplied to the ED/WD digital scan converter 12 so that it can be subsequently projected onto a screen through the projector 13. The descrambling method is most preferred to be effected in the projector 13, however, it may be effected in the ED/WD digital scan converter 10 or in a stage front or rear of the converter 10.

Thus, since the signal transmitted via the satellite and the signal recorded in the distribution tape are, even though in the form of the composite signal and the component signal, respectively, subjected to the scrambling process utilizing the same algorithm, one and the same descrambler can be used to descramble those signals after receipt thereof and, at the same time, softwares distributed in different forms for the transmission system and a packaging system can be concurrently used. Accordingly, the present invention is effective to provide the video theater system highly reliable in security.

Figure 6:
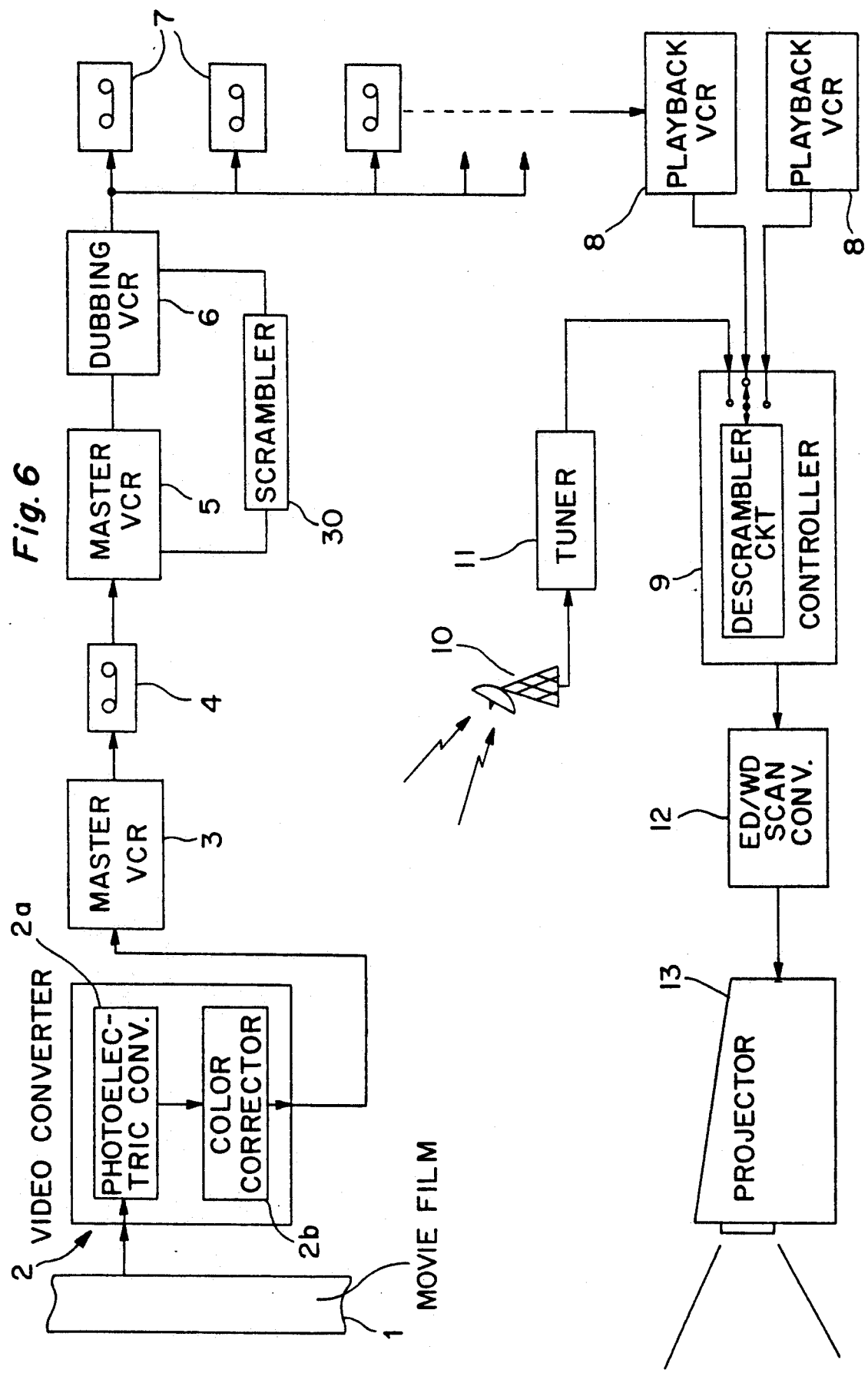
Figure 7:
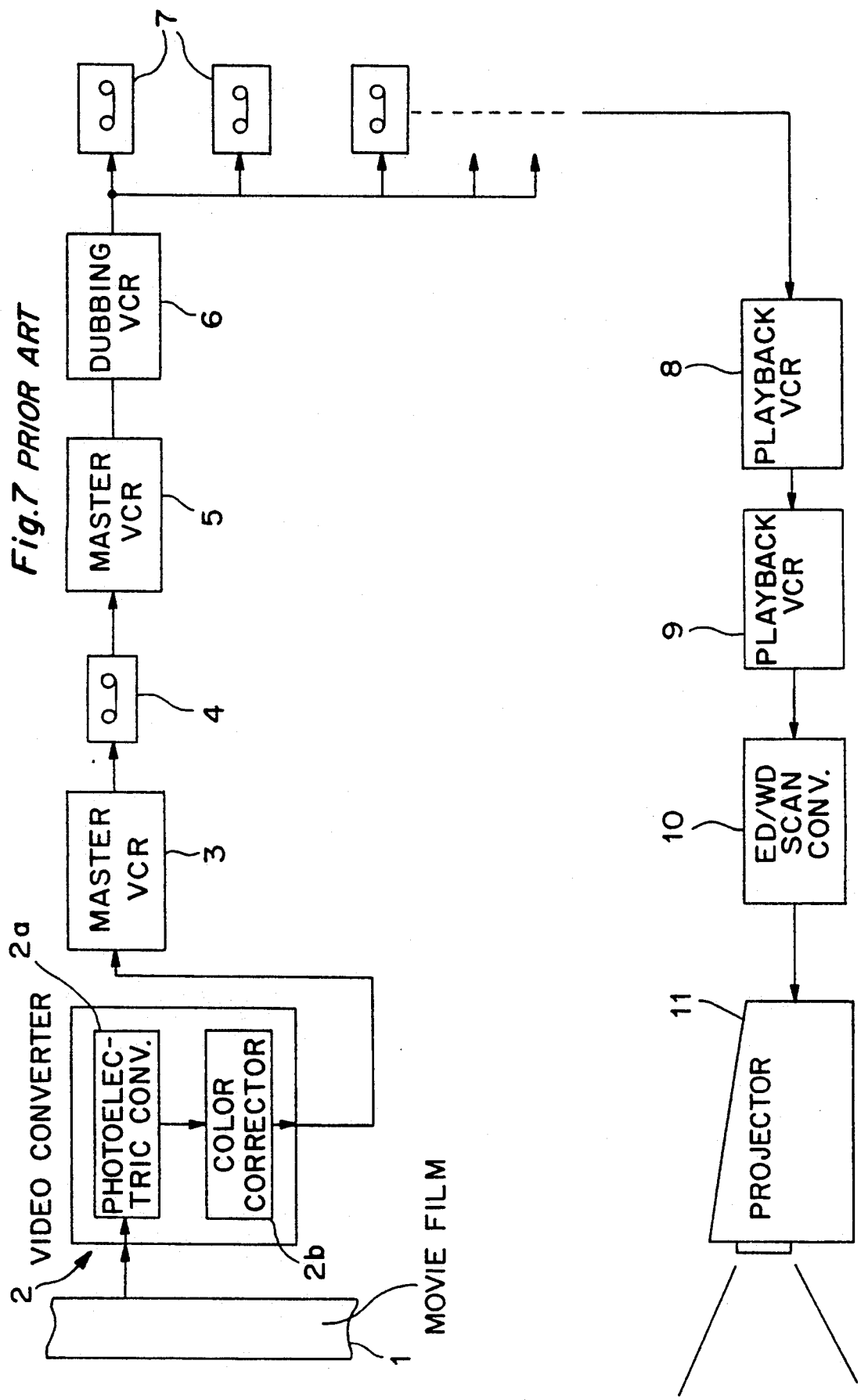
FIG. 7 is a block diagram of the conventional system of converting a movie to video tape for projection in a video theater.

The video theater system according to a fourth preferred embodiment of the present invention is shown in FIG. 6. The system shown therein is substantially similar to that shown in FIG. 5 except for the copy preventive process. However, in the embodiment of FIG. 6, the scrambler 30 is connected between the master VCR 5 and the dubbing VCR 6 while the descrambler 31 is disposed inside the controller 9. The scrambling is carried out according to the line permutation. It is to be noted that, since the synchronizing signal of the video signal is retained, the video signal can be recorded by the VCR 6 as usual.

The line permutation scrambling effected in the practice of the fourth embodiment of the present invention is identical with that described with reference to FIG. 3. In other words, the effective screen area of each field is divided into 240 scan lines which are then grouped in blocks of 30 or 60 lines as shown in FIG. 3. These two different blocks are randomly generated, and the lines in each block are further randomized. This compound randomization makes it more difficult to interpret the block boundaries. In this case a scrambling key is inserted to the vertical blanking period, and the descrambler uses this key to restore the image.

In the illustrated embodiment, although no copy preventive scheme applied to a voice signal is now shown, the voice signal was scrambled by adding PN codes (pseudorandom codes) to a PCM voice signal.

Referring still to FIG. 6, the controller device 9 has four video and sound input terminals, although only three input terminals are shown. Of those four input terminals, one is fed from the tuber 11 and the remaining three are fed from respective VCRs 8. The controller device has capabilities of selecting one of the four input lines and descrambling the selected input signal and then outputs a reconstructed video signal and a reconstructed voice signal, both of which are subsequently applied to the ED/WD scan converter 12. Accordingly, the controller device in the video theater system of the present invention is of a type having the descrambler built therein and is effective to provide an extremely high security.

From the foregoing description, it is clear that the video theater system of the present invention is such that the scrambling is effected at the time the video signal is copied to the distribution tapes and even the signal transmitted via the satellite is equally scrambled according to the scrambling method utilizing the same algorithm, the use of one and the same descrambler suffices to descramble any one of those signals received and, at the same time, softwares distributed in different forms for the transmission system and a packaging system can be concurrently used.

Furthermore, the controller used in the video theater system according to the present invention includes a first input terminal to which an output signal reproduced from the VCR tape having recorded therein at least the video signal which has been scrambled is applied, and a second input terminal to which the signals transmitted from the uplink antenna and the tuner are applied, a descrambling device for selecting one of the signals inputted respectively to the first and second input terminals and descrambling an output signal which has been selected. Therefore, a high security can be equally secured in both of the transmission and packaging systems and, also, no reduction in quality of the reconstructed video information occur substantially.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a video theater system having a video converter including means for photoelectrically converting a movie film into a video signal and coupled thereto means for applying a color correction, a master video cassette recorder coupled to said video converter for producing a master tape, a first video cassette recorder for using the video output of said master video cassette recorder to duplicate the master tape to produce at least one distribution tape, a second video cassette recorder that plays back the distribution tape, a controller, and a projection means for projecting a final normal video image, a copy preventative system comprising:

means for scrambling, in a predetermined manner, an intermediate video signal generated by said video theater system prior to the production of said distribution tape, while at least a synchronizing signal is retained; and means for descrambling, in a predetermined manner, said scrambled intermediate video signal subsequent to the playing back of said distribution tape.

2. The system as claimed in claim 1, wherein said means for scrambling scrambles one of (1) said video signal and (2) said color corrected video signal.

3. The system as claimed in claim 1, wherein said means for descrambling descrambles said scrambled intermediate video signal in the projector means.

4. The system as claimed in claim 1, wherein said means for descrambling descrambles the scrambled intermediate video signal between said controller and said projection means.

5. The system as claimed in claim 1, wherein the video signal from the master tape after video conversion to the second video cassette recorder is transmitted by means of a component signal.

6. The system as claimed in claim 1, wherein said means for scrambling scrambles the video output of said master video cassette recorder.

7. A copy preventive method for a video theater system having a video converter including means for photoelectrically converting a movie film into a video signal and coupled thereto means for applying a color correction, a master video cassette recorder coupled to said video converter for producing a master tape from a signal outputted from the video converter, a first video cassette recorder for using the video output from said master video cassette recorder to duplicate the master tape to produce at least one distribution tape, a second video cassette recorder that plays back the distribution tape, a controller, and a projection means for projecting a final normal video image, said method comprising the steps of:

scrambling an intermediate video signal, generated by said video theater system prior to the production of said distribution tape, by one of (1) line permutation and (2) polarity inversion while maintaining a synchronizing signal in the scrambled video signal; and descrambling the scrambled intermediate video signal subsequent to playing back the distribution tape.

8. The method as claimed in claim 7, wherein line permutation scrambled information is transmitted during a blanking period of a vertical synchronizing signal.

9. A video theater system comprising:

means for scrambling at least a component video signal of a video cassette recording, wherein said means for scrambling performs one of (1) line rotation and (2) line permutation;

a video cassette recorder for reproducing the scrambled video cassette recording;

a tuner and an antenna for receiving an scrambled signal transmitted via a satellite;

a controller device for controlling the video cassette recorder and the tuner;

means for descrambling the scrambled video signal; and projector means for projecting a video image from the descrambled video signal.

10. The system as claimed in claim 9, wherein said scrambling performed by said means for scrambling is the same as that performed on the scrambled signal received from the satellite.

* * * * *